(12) United States Patent
Yeow et al.

(10) Patent No.: US 7,065,605 B2
(45) Date of Patent: Jun. 20, 2006

(54) DYNAMIC MASK-ROM REGISTER PATCHING

(75) Inventors: WeiMing Yeow, Singapore (SG);
QuekLeong Choo, Singapore (SG);
Myint Ngwe, Singapore (SG);
FongKheon Chong, Singapore (SG);
KianWai Ng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 545 days.

(21) Appl. No.: 10/628,696

(22) Filed: Jul. 28, 2003

(65) Prior Publication Data

US 2005/0028023 A1     Feb. 3, 2005

(51) Int. Cl.
*G06F 12/00*    (2006.01)
(52) U.S. Cl. .................. 711/4; 711/112; 711/114; 713/1; 713/2
(58) Field of Classification Search .............. None
See application file for complete search history.

(56) References Cited

U.S. PATENT DOCUMENTS

| 5,252,812 A | 10/1993 | Nakamura ............... 235/380 |
| 5,617,339 A * | 4/1997 | Smith ..................... 702/176 |
| 6,393,561 B1 | 5/2002 | Hagiwara et al. ........ 713/100 |
| 6,456,452 B1 * | 9/2002 | Hobson et al. ......... 360/78.07 |
| 6,636,985 B1 * | 10/2003 | Ono et al. ................ 714/8 |

* cited by examiner

*Primary Examiner*—Donald Sparks
*Assistant Examiner*—Hashem Farrokh
(74) *Attorney, Agent, or Firm*—Shumaker & Sieffert, P.A.

(57) ABSTRACT

According to one embodiment of the present invention, a method of tuning a Power-On-Reset (POR) register in a data storage device comprises determining a tuned value for the POR register using feedback from the data storage device obtained during a certification process of the data storage device and storing a list in one or more system sectors of the data storage device, the list comprising an address of the POR register to be patched and the tuned value. According to another embodiment of the present invention, a disc drive comprises a rotatable disc, a microprocessor, and a memory. The memory has a start-up routine that, when executed by the microprocessor, causes the microprocessor to patch a Power-On-Reset (POR) register using a tuned values stored in one or more system sectors of the rotatable disc.

24 Claims, 6 Drawing Sheets

DYNAMIC MASK-ROM REGISTER PATCHING

FIELD OF THE INVENTION

This application relates generally to digital data storage devices and more particularly to dynamic mask-ROM register patching during certification testing of the data storage device.

BACKGROUND OF THE INVENTION

A data storage device such as a magnetic, optical, or magneto-optical drive includes several main electronic components such as a read/write channel chip, a differential preamplifier, and a main controller incorporating a microprocessor. Firmware code stored in memory, either external or internal to the microprocessor, and executed by the microprocessor controls the behavior of the components of the data storage device. Additionally, registers maintained in the memory store values used by the firmware code to control the individual components. That is, the behavior of the components of the data storage device may be controlled in part by the values set in these registers. Included in these register values may be a set of permanent Power-On-Reset (POR) register values that are loaded into the registers of the various components by a start-up routine executed every time power is applied to the data storage device.

During the initial stages of drive development, the firmware codes and POR register values are saved in an external Read-Only Memory (ROM) such as a flash ROM. Code used during power up of the data storage device such as a start-up routine and a set of default POR register values can be programmed into the flash ROM as needed. The flash ROM is helpful because the ROM codes and POR register values are constantly changing during the initial stages of drive development. However, as the design matures, the code and POR values are fixed and seldom change. Therefore, an economical way to store this data is to integrate it into a piece of hardware such as the internal ROM of the microprocessor. Apart from saving cost, saving the code and POR values in ROM will also reduce processing time during certification testing of the data storage device by eliminating ROM code from the list of files that are downloaded into the drive during the certification process.

Certification of the data storage device typically takes place after the data storage device has completed or nearly completed the manufacturing process. The certification process may involve tests of a variety of parameters related to performance of the data storage device to determine whether the device will be suitable for its potential uses. For example, certification testing may include a time-to-ready test that determines whether the data storage device is able to start up within an amount of time acceptable to users of the device.

The POR register values stored in the ROM are typically mean values obtained from a large population of drives that had passed certification testing in the initial development phase. Therefore, the POR register values are determined based on the assumption that a generic set of POR register values should work for the majority of drives.

However, problems arise when the POR register values are not tuned for some drives. That is, the generic set of POR register values stored in the ROM is not appropriate for some drives. One reason a generic set of POR register values may not work well in all registers is the fact the some of these registers are used to store values used to counter drift or set gain, offset, etc in analog circuits. Therefore, there may be a big difference between the generic POR register values stored in the ROM and appropriate POR register values for some circuits in some drives.

As a result, these drives may experience a large number of read retries and require a much longer time to boot-up. These drives may therefore fail in a time-to-ready test that may be part of the certification process and cause a significant process yield problem. However, these drives may not be physically faulty and may even perform well with register values that are tuned to that specific drive.

However, since it is a read-only memory, the ROM is generally unchangeable once it has been set. Accordingly there is a need for a method of patching specific registers with tuned values at an early stage of the start-up routine. The present invention provides a solution to this and other problems, and offers other advantages over the prior art.

SUMMARY OF THE INVENTION

Against this backdrop the present invention has been developed. One embodiment of the present invention provides a method of tuning a Power-On-Reset (POR) register in a data storage device comprises determining a tuned value for the POR register using feedback from the data storage device obtained during a certification process of the data storage device and storing a list in one or more system sectors of the data storage device, the list comprising an address of the POR register to be patched and the tuned value.

Another embodiment of the present invention provides a disc drive that has a rotatable data storage disc, a microprocessor, and a memory wherein the memory includes a start-up routine that, when executed by the microprocessor, causes the microprocessor to patch a Power-On-Reset (POR) register using a tuned value retrieved from one or more system sectors of the data storage disc.

These and various other features as well as advantages which characterize the present invention will be apparent from a reading of the following detailed description and a review of the associated drawings.

DETAILED DESCRIPTION

Embodiments of the present invention will be discussed with reference to a magnetic disc drive. One skilled in the art will recognize that the present invention may also be applied to any data storage device, such as an optical disc drive, a magneto-optical disc drive, or a compact disc drive, that utilizes register settings saved in a ROM.

Figure 1:
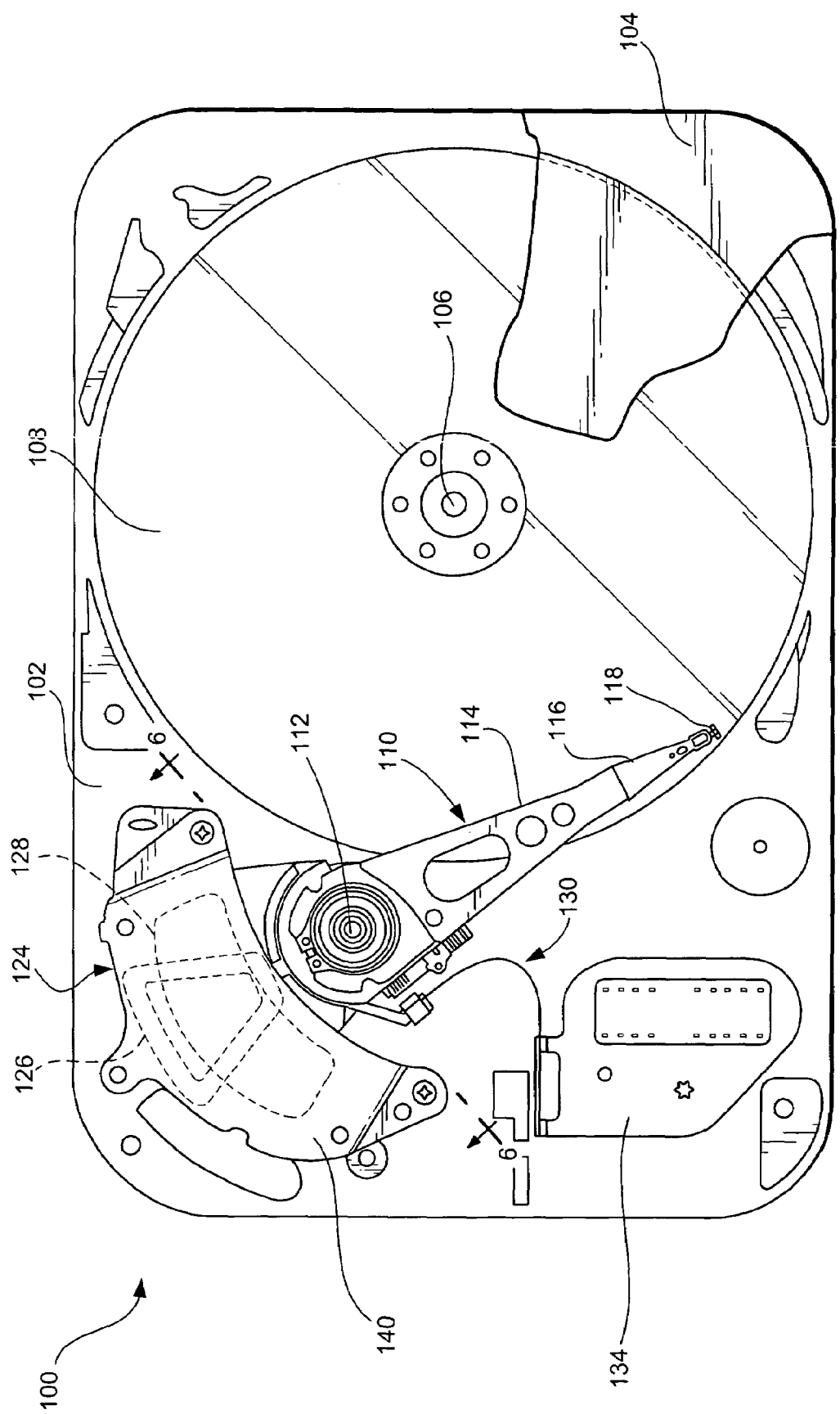
FIG. 1 is a plan view of a disc drive in accordance with an embodiment of the present invention illustrating the primary internal components of the disc drive.

FIG. 1 is a plan view of a disc drive in accordance with an embodiment of the present invention illustrating the primary internal components of the disc drive. The disc drive 100 includes a base 102 to which various components of the disc drive 100 are mounted. A top cover 104, shown partially cut away, cooperates with the base 102 to form an internal, sealed environment for the data storage device in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent to the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes a fluid bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are typically moved over park zones 120 typically near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a data storage device printed circuit board (not shown) typically mounted to the bottom side of the disc drive 100.

Figure 2:
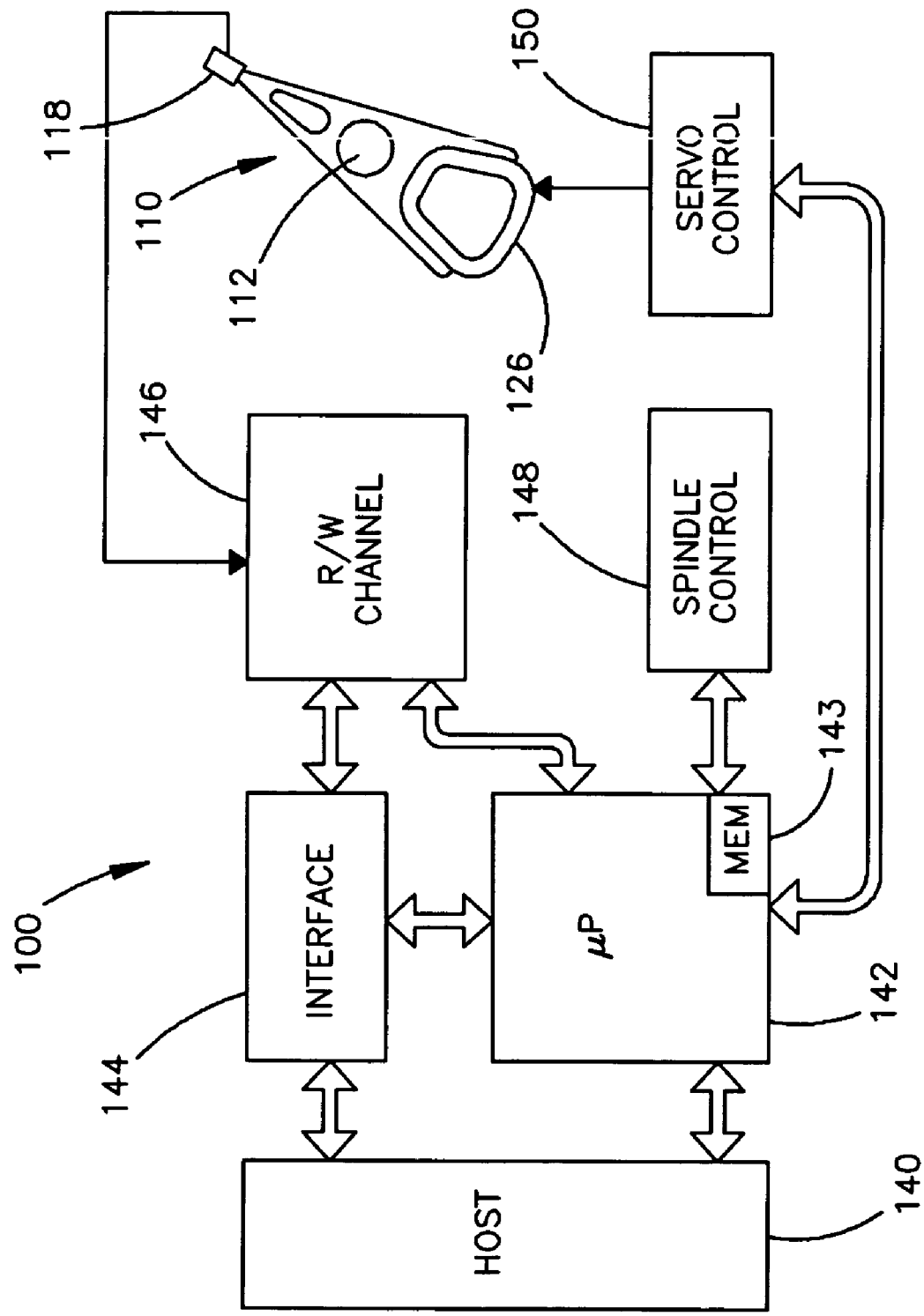
FIG. 2 is a control block diagram for the disc drive shown in FIG. 1 illustrating the primary functional components.

FIG. 2 is a functional block diagram of the disc drive 100 of FIG. 1, generally showing the main functional circuits which are resident on the disc drive printed circuit board and used to control the operation of the disc drive 100. The disc drive 100 is operably connected to a host computer 140 in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle motor control circuit 148, which typically electrically commutates the spindle motor 106 (FIG. 1) through the use of back electromotive force (BEMF) sensing. During a seek operation, wherein the actuator 110 moves the heads 118 between tracks, the position of the heads 118 is controlled through the application of current to the coil 126 of the voice coil motor 124. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor coil 126, thereby causing the actuator assembly 110 to be pivoted.

Data is transferred between the host computer 140 or other device and the disc drive 100 by way of an interface 144, which typically includes a buffer to facilitate high speed data transfer between the host computer 140 or other device and the disc drive 100. Data to be written to the disc drive 100 is thus passed from the host computer 140 to the interface 144 and then to a read/write channel 146, which encodes and serializes the data and provides the requisite write current signals to the heads 118. To retrieve data that has been previously stored in the disc drive 100, read signals are generated by the heads 118 and provided to the read/write channel 146, which performs decoding and error detection and correction operations and outputs the retrieved data to the interface 144 for subsequent transfer to the host computer 140 or other device.

A set of permanent Power-On-Reset (POR) register values may be stored in a Read-Only Memory (ROM) in memory 143 of the microprocessor 142. These generic POR register values are loaded into registers for controlling the various functional circuits of the disc drive 100 every time power is applied to the disc drive 100. When power is applied to the data storage device, a start-up routine residing in memory 143 will fetch the POR register values and load these values into the appropriate registers. Loading the registers with the POR register values prepares the drive 100 for a first read operation.

The register values may be tuned for a specific data storage device to determine values that are more suitable for that device than the generic values. Tuning can be performed during a certification process for the data storage device using feedback obtained from the device during certification. Additionally, tuning the register values during the early stages of certification allows the tuned register values to be used during subsequent stages of the certification process. For example, read/write parameter tuning is typically performed at an early stage of certification. Further, the feedback obtained from the data storage device during read/write parameter tuning would be helpful in determining tuned register values.

Figure 3:
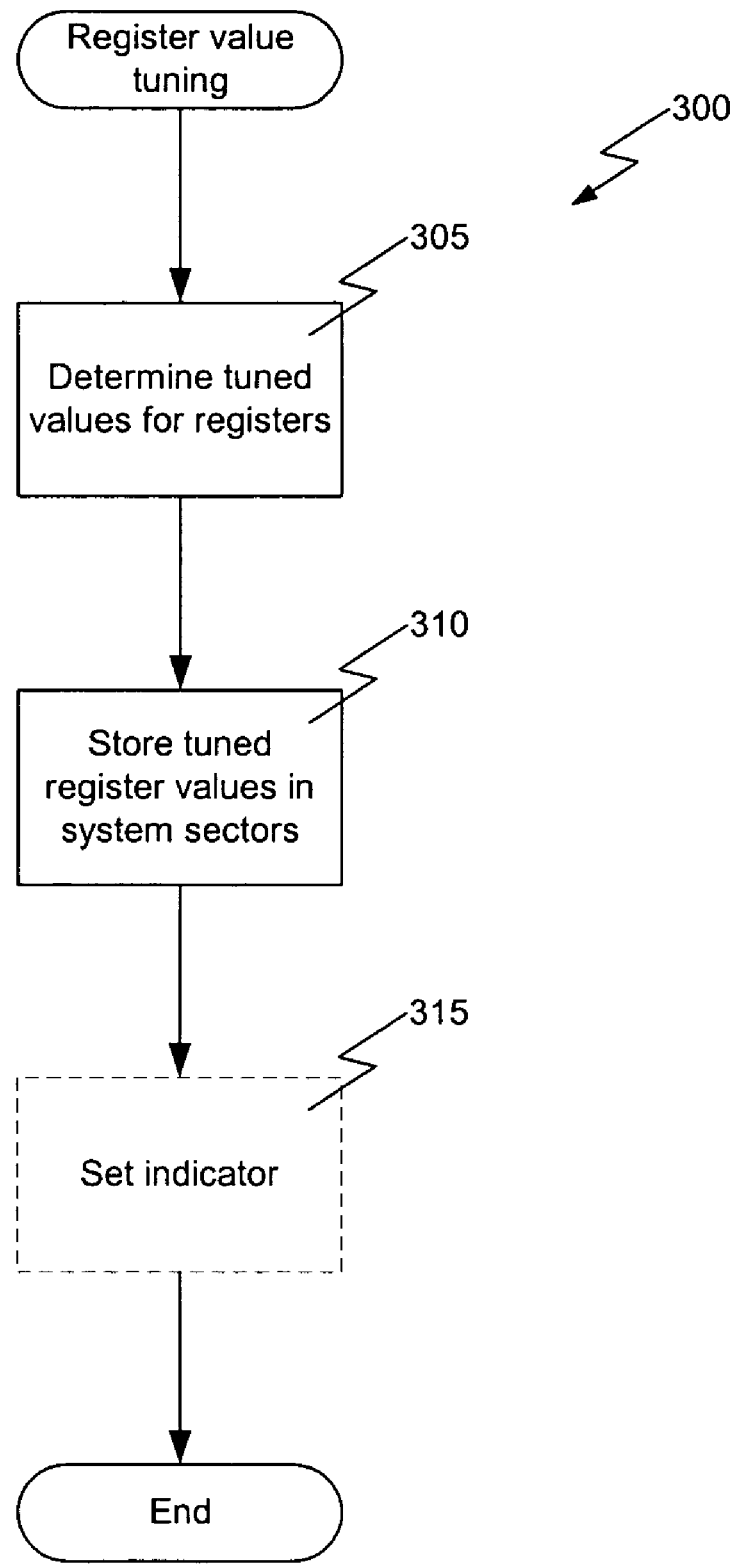
FIG. 3 is a flowchart illustrating a process for register value tuning during certification testing according to one embodiment of the present invention.

FIG. 3 is a flowchart illustrating a process for register value tuning during certification testing according to one embodiment of the present invention. The process 300 begins with determination operation 305 where tuned register values are determined. This determination 305 may be based on feedback obtained from the data storage device during a certification process such as when performing read/write parameter tuning. Control then passes to save operation 310.

During save operation 310, the tuned register values are saved in system sectors of the data storage device. For example, a register list containing register addresses to be patched and the tuned register values may be saved in the system sectors the disc. By saving the tuned register values in the system sectors of the data storage device, the values may be preserved without a need to change the generic values in the ROM. Additionally, the tuned register values may be easily changed or updated at a later time.

Optionally, the register value tuning process 300 may also include a set operation 315. In set operation 315 a flag may be set in a system sector of the data storage device if at least one tuned value has been determined. Alternatively, set operation 315 may store a null value in the first address in the list stored in the one or more system sectors of the data storage device if no tuned values have been determined. In either case, optional set operation 315 stores an indication of whether tuned values have been determined and therefore, whether register patching should be performed upon start-up of the data storage device.

For some registers, the generic register value stored in ROM is appropriate and works well. Register value tuning may be more useful for registers that experience a broad range of values in normal use such as those related to countering drift or setting values such as gain, offset, etc in analog circuits. Therefore, in some cases, tuned register values may be determined for only those registers in which the generic values do not work well considering the broad possible range of tuned values.

For example, some data storage devices may include a read/write channel chip that contains a register value used to compensate for the DC shift in the read back signal. The variation of such a filter may be relatively large due to the fact that it is a hardware filter. Thus, the tuned value of such a register from chip to chip may be quite different from the generic value stored in the ROM. In this example, there may be no one generic register value that works well in a large number of drives. Such a circuit would likely perform better in certification and in use with a tuned register value.

Once determined, the tuned register values saved in the system sectors of the data storage device are used by a modified start-up routine to overwrite or patch the generic register values of the ROM. A conventional start-up routine is quite straight forward. Typically, such a routine, once initialized, will proceed to load system files, defect tables, and various system overlays saved in ROM. According to one embodiment of the present invention, a modified start-up routine reads the tuned register values from the data storage device and uses these tuned values to patch the generic ROM values.

Figure 4:
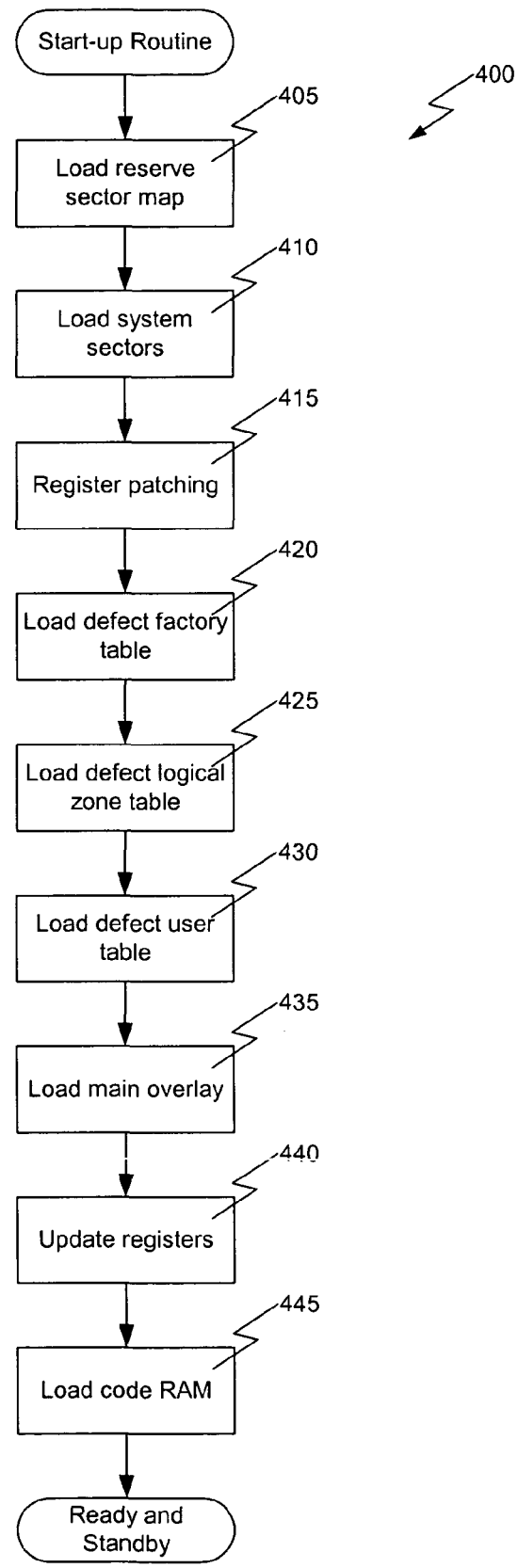
FIG. 4 is a flowchart illustrating a start-up routine including register patching according to another embodiment of the present invention.

FIG. 4 is a flowchart illustrating a start-up routine including register patching. In this example, patching of the ROM values is performed early in the start-up routine before a large amount of data is read from or written to the disc. This routine 400 may be implemented in a series of instructions stored in the memory 143 of the disc drive 100 or other data storage device and executed by the microprocessor 142.

The routine 400 begins with load operation 405 in which a Reserve Sector Map (RSM) is loaded. The RSM is a table (or map) that tells the operating system the location of all the files in a reserved zone. In many cases, the RSM is the first item to be read from the drive during a start-up routine. Control then passes to load operation 410.

In load operation 410 system sectors are loaded. System sectors may contain channel parameters, zone boundaries information, drive configurations such as drive age, model number and capacity, as well as the tuned register values as discussed above. Once system sectors are loaded, control passes to patch operation 415.

In patch operation 415 register patching is performed using the tuned register values from the system sectors. That is, the tuned register values are read from the system sectors and written into the appropriate registers. The start-up routine 400 may, for example, call a subroutine or otherwise initiate another routine that will perform register patching. Details of an exemplary routine for register patching will be described below with reference to FIG. 5. Once patching has been completed, control passes to load operation 420.

In load operations 420 through 430, defect data is loaded. While the number and nature of these tables may vary, some common tables are illustrated. For example, in load operation 420 a defect factory table is loaded. The defect factory table contains the defect locations captured by a defect scan performed during certification testing. The defect locations in this table are typically recorded in Cylinder, Head and Sector (CHS) format. This table is also known as he primary defect table. Once the defect factory table is loaded, control passes to load operation 425.

In load operation 425 a defect logical zone table is loaded. The defect logical zone table is basically the conversion of defect locations from CHS format in the defect factory table into Logical Block Addressing (LBA) format. After loading of the defect logical zone table, control passes to load operation 430.

A defect user table may be loaded in load operation 430. This table contains defect data updated during the certification process. For example, upon the completion of the drive certification process, any new defects found in the drive may be saved in the defect user table.

Next, control passes to load operation 435 where the main overlays are loaded. The entire firmware comprises several overlays or files. The center of the overlay structure is the main overlay. The main overlay contain all the codes important for drive functionality. Once this overlay has been loaded, control passes to load operation 440.

In load operation 440 register values are updated. That is, after the main overlay is loaded, register values for registers other than the POR register values may be updated. This process of updating register values occurs only after the main overlay is loaded and does not utilize the tuned register values stored in the system sectors of the disc.

Finally, control passes to load operation 445 where code RAM is loaded. In this operation remaining code stored in RAM is loaded. This code is not part of the main overlays but may be used to support drive functionality.

In summary, the modified start-up routine will read the tuned register values from the data storage device and use these tuned values to patch the generic mask-ROM values. Patching of the mask-ROM values is performed early in the start-up routine before a large amount of data is read from or written to the disc. By performing patching early in the start-up routine, subsequent stages of the start-up routine may benefit from using the tuned register values and experience fewer read/write errors as a result. With fewer read/write errors, the drive using tuned register values will demonstrate a quicker time to ready and be less likely to fail in certification.

As discussed above, not all registers are patched with tuned register values. Register patching may be more useful for registers related to analog circuits. Therefore, the system sectors may contain a list of registers to be patched. For example, a register list containing register addresses to be patched and the corresponding tuned register values may be saved in the system sectors the disc. The patching routine stored in the ROM and executed during the modified start-up routine 400 will scan through the register list. Once an entry is detected, the register patching routine will fetch the register address and program the register with the tuned value.

Figure 5:
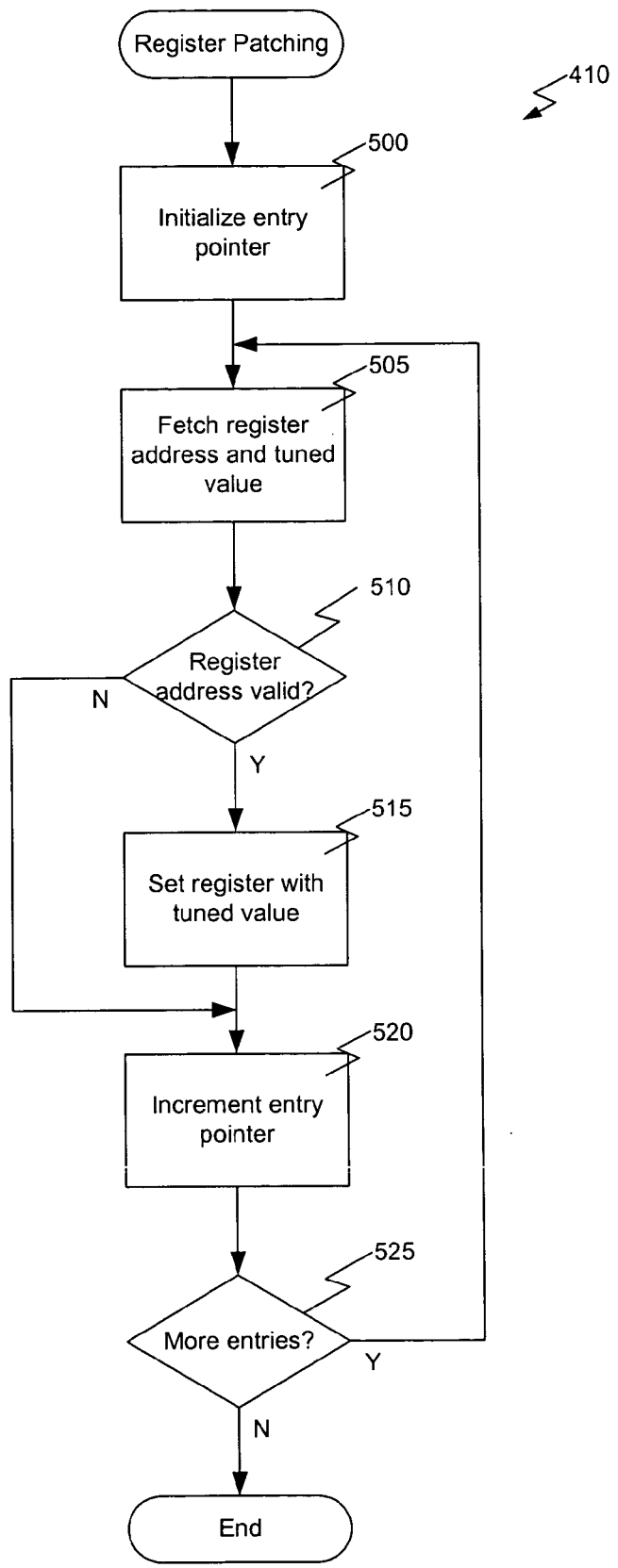
FIG. 5 is a flowchart illustrating a routine for register patching within the start-up routine of FIG. 4.

FIG. 5 is a flowchart illustrating a routine for register patching within the start-up routine of FIG. 4. This routine 415 may be implemented in a series of instructions stored in the memory 143 of the disc drive 100 or other data storage device and executed by the microprocessor 142.

The routine 415 begins with initialization operation 500 in which an entry pointer is initialized. For example, the entry pointer may be set to a value that indicates a beginning position in the register list.

Once initialization operation 500 is complete, control passes to fetch operation 505 where the register address and value indicated by the entry pointer are fetched. In other words, the first item is read from the list containing register addresses to be patched and the corresponding tuned register values. Control then passes to query operation 510.

In query operation 510 a determination is made as to whether the register address read during fetch operation 505 is a valid register address. This determination may be based, for example, on a simple comparison of the register address to a range of valid register addresses.

If the register address is determined to be valid at query operation 510, control passes to set operation 515. In set operation 515 the register indicated by the address read in fetch operation 505 is programmed or set to the tuned value also read in fetch operation 505. That is, the tuned register value is written to the register.

Next, control passes to increment operation 520 where the entry pointer is incremented to indicate the next entry in the register list. Control then passes to query operation 525.

At query operation 525, a determination is made as to whether there are more register entries to be updated. This determination may be based on determining whether the entry pointer has exceeded the number of register entries. Therefore, this determination may be made by comparing the entry pointer to a constant representing a number of entries in the register list.

If, at query operation 525, the entry pointer has not exceeded the maximum number of entries, control returns to fetch operation 505 where the next register address and value indicated by the entry pointer is fetched. If, at query operation 525, a determination is made that the entry pointer has exceeded the number of entries, processing will end.

Figure 6:
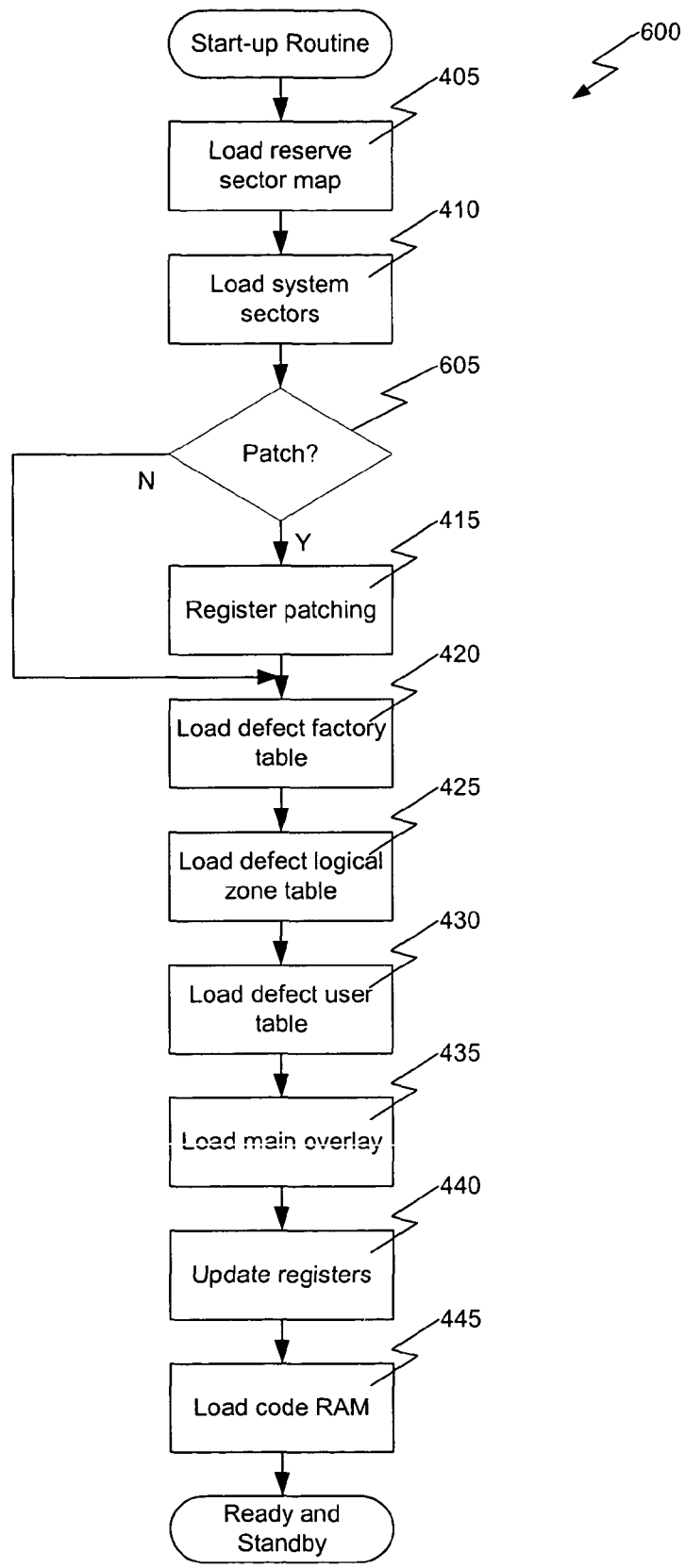
FIG. 6 is a flowchart illustrating a start-up routine including register patching according to an alternative embodiment of the present invention.

Alternatively, rather than performing a register patching routine 415 each time power is applied to the data storage device, the start-up routine 400 may include a query operation that determines whether a register patching routine should be executed. FIG. 6 is a flowchart illustrating a start-up routine including register patching according to this alternative embodiment of the present invention. This routine 600 may be implemented in a series of instructions stored in the memory 143 of the disc drive 100 or other data storage device and executed by the microprocessor 142.

The routine 600 begins with load operation 405 in which a Reserve Sector Map (RSM) is loaded. The RSM is a table (or map) that tells the operating system the location of all the files in a reserved zone. In many cases, the RSM is the first item to be read from the drive during a start-up routine. Control then passes to load operation 410.

In load operation 410 system sectors are loaded. System sectors may contain channel parameters, zone boundaries information, drive configurations such as drive age, model number and capacity, as well as the tuned register values as discussed above. Once system sectors are loaded, control passes to query operation 605.

In query operation 605 a determination is made regarding whether to perform register patching. This determination may be based on the state of a flag or software switch stored in ROM. Alternatively, the query operation may read the first entry in the list of register addresses to be patched and the corresponding tuned register values. The determination may then be based on whether the first address pointer is a null pointer. If, in query operation 605, a determination is made that register patching should be performed, control passes to patch operation 415.

In patch operation 415 register patching is performed using the tuned register values from the system sectors. That is, the tuned register values are read from the system sectors and written into the appropriate registers. The start-up routine 400 may, for example, call a subroutine or otherwise initiate another routine that will perform register patching. Details of an exemplary routine for register patching will be described below with reference to FIG. 5. Once patching has been completed, control passes to load operation 420.

If, in query operation 605, a determination is made that register patching should not be performed control passes to load operation 420. In load operations 420 through 430, defect data is loaded. While the number and nature of these tables may vary, some common tables are illustrated. For example, in load operation 420 a defect factory table is loaded. The defect factory table contains the defect locations captured by a defect scan performed during certification testing. The defect locations in this table are typically recorded in Cylinder, Head and Sector (CHS) format. This table is also known as he primary defect table. Once the defect factory table is loaded, control passes to load operation 425.

In load operation 425 a defect logical zone table is loaded. The defect logical zone table is basically the conversion of defect locations from CHS format in the defect factory table into Logical Block Addressing (LBA) format. After loading of the defect logical zone table, control passes to load operation 430

A defect user table may be loaded in load operation 430. This table contains defect data updated during the certification process. For example, upon the completion of the drive certification process, any new defects found in the drive may be saved in the defect user table.

Next, control passes to load operation 435 where the main overlays are loaded. The entire firmware comprises several overlays or files. The center of the overlay structure is the main overlay. The main overlay contain all the codes important for drive functionality. Once this overlay has been loaded, control passes to load operation 440.

In load operation 440 register values are updated. That is, after the main overlay is loaded, register values for registers other than the POR register values may be updated. This process of updating register values occurs only after the main overlay is loaded and does not utilize the tuned register values stored in the system sectors of the disc.

Finally, control passes to load operation 445 where code RAM is loaded. In this operation remaining code stored in RAM is loaded. This code is not part of the main overlays but may be used to support drive functionality.

Therefore, dynamic register patching may be used to alter a register's generic ROM value during execution of the start-up routine without having to change the ROM. This will save a substantial amount of resources and time. This approach also provides a dynamic Power-On-Reset register value. In other words, the POR register value is not fixed to a constant value but is changeable at any time during the drive certification process.

Stated another way, according to one embodiment of the present invention, a method (such as 300) of tuning a Power-On-Reset (POR) register in a data storage device (such as 100) comprises determining a tuned value for the POR register using feedback from the data storage device (such as 100) and storing a list in one or more system sectors of the data storage device (such as 100), the list comprising an address of the POR register to be patched and the tuned value.

According to another embodiment of the present invention, a method (such as 400 or 600) of starting a data storage device (such as 100) when power is applied to the data storage device such as 100) comprises loading a reserve sector map into a memory (such as 143) of the data storage device (such as 100) from a storage medium (such as 108) in the data storage device such as 100), loading system sectors into the memory (such as 142) of the data storage device (such as 100) from the storage medium (such as 108) in the data storage device (such as 100), and patching a Power-On-Reset (POR) register using one or more tuned values stored in a list in one or more system sectors, the list comprising an address of the POR register to be patched and the tuned value.

According to yet another embodiment of the present invention, a data storage device (such as 100) comprises a storage medium (such as 108), a microprocessor (such as 142), and a memory (such as 143). The memory (such as 143) has stored therein a start-up routine (such as 400 or 600) that, when executed by the microprocessor (such as 142), loads a reserve sector map into the memory (such as 143) from the storage medium (such as 108), loads system sectors into the memory (such as 143) from the storage medium (such as 108), and patches a Power-On-Reset (POR) register using one or more tuned values stored in a list in one or more system sectors, the list comprising an address of the POR register to be patched and the tuned value.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, rather than storing the tuned register values in system sectors of the data storage device, the tuned values may be stored elsewhere on the disc. For example, the tuned values may be stored in other sectors of the data storage device or even in a RAM or a ROM other then the ROM. Numerous other changes may be made which will readily suggest themselves to those skilled in the art and which are encompassed in the spirit of the invention disclosed and as defined in the appended claims.

What is claimed is:

1. A method of tuning a Power-On-Reset (POR) register in a data storage device, the method comprising:
   determining a tuned value for the POR register using feedback from the data storage device; and
   storing the tuned value on a storage medium of the data storage device.

2. The method of claim 1, wherein the tuned value is stored in a list comprising an address of the POR register to be patched and the tuned value.

3. The method of claim 1, wherein the tuned value is stored in a system sector of the storage medium of the data storage device.

4. The method of claim 1, wherein tuning is performed during a certification process for the data storage device.

5. The method of claim 4, wherein tuning is performed during a read/write parameter tuning of the certification process.

6. The method of claim 1, further comprising storing an indication of whether tuned values have been determined.

7. The method of claim 6, wherein storing an indication of whether tuned values have been determined comprises storing a null value in a first address in the list stored in the one or more system sectors of the data storage device if no tuned values have been determined.

8. The method of claim 6, wherein storing an indication of whether tuned values have been determined comprises setting a flag in a system sector of the data storage device if at least one tuned value has been determined.

9. A method of starting a data storage device when power is applied to the data storage device, the method comprising:
   loading a reserve sector map into a memory of the data storage device from a storage medium in the data storage device;
   loading system sectors into the memory of the data storage device from the storage medium in the data storage device; and
   patching a Power-On-Reset (POR) register using one or more tuned values stored in a list in one or more system sectors, the list comprising an address of the POR register to be patched and the tuned value.

10. The method of claim 9, wherein patching a Power-On-Reset (POR) register comprises:
    fetching the address of the POR register to be patched and the tuned value from the list in one or more system sectors of the storage medium;
    determining whether the address of the POR register to be patched is a valid register address; and
    responsive to the address of the POR register to be patched being a valid register address, setting the POR register to be patched to the tuned value.

11. The method of claim 9, further comprising prior to patching a POR register determining whether patching should be performed.

12. The method of claim 11, wherein determining whether patching should be performed comprises determining whether a first address in the list stored in the one or more system sectors of the data storage device is a null value.

13. The method of claim 11, wherein determining whether patching should be performed comprises determining whether a flag in a system sector of the data storage device is set.

14. The method of claim 10, further comprising initializing an entry pointer indicating a position in the list in one or more system sectors of the storage medium prior to fetching the address of the POR register to be patched and the tuned value from the list.

15. The method of claim 14, further comprising incrementing the entry pointer after setting the POR register to be patched to the tuned value.

16. The method of claim 14, wherein determining whether the address of the POR register to be patched is a valid register address comprises comparing an address from the list indicated by the entry pointer to a range of valid register addresses.

17. A data storage device comprising:
a storage medium;
a microprocessor; and
a memory, the memory having stored therein a start-up routine that, when executed by the microprocessor, loads a reserve sector map into the memory from the storage medium, loads system sectors into the memory from the storage medium, and patches a Power-On-Reset (POR) register using one or more tuned values stored in a list in one or more system sectors, the list comprising an address of the POR register to be patched and the tuned value.

18. The data storage device of claim 17, wherein the start-up routine further:
fetches the address of the POR register to be patched and the tuned value from the list in one or more system sectors of the storage medium;
determines whether the address of the POR register to be patched is a valid register address; and
responsive to the address of the POR register to be patched being a valid register address, sets the POR register to be patched to the tuned value.

19. The data storage device of claim 17, wherein the start-up routine prior to patching a POR register determines whether patching should be performed.

20. The data storage device of claim 19, wherein the start-up routine determines whether patching should be performed by determining whether a first address in the list stored in the one or more system sectors of the data storage device is a null value.

21. The data storage device of claim 19, wherein the start-up routine determines whether patching should be performed by determining whether a flag in a system sector of the data storage device is set.

22. The data storage device of claim 18, wherein the start-up routine initializes an entry pointer indicating a position in the list in one or more system sectors of the storage medium prior to fetching the address of the POR register to be patched and the tuned value from the list.

23. The data storage device of claim 22, wherein the start-up routine increments the entry pointer after setting the POR register to be patched to the tuned value.

24. The data storage device of claim 22, wherein the start-up routine determines whether the address of the POR register to be patched is a valid register address by comparing an address from the list indicated by the entry pointer to a range of valid register addresses.

* * * * *